(12) United States Patent
Lindores

(10) Patent No.: US 7,363,154 B2
(45) Date of Patent: Apr. 22, 2008

(54) METHOD AND SYSTEM FOR DETERMINING THE PATH OF A MOBILE MACHINE

(75) Inventor: Robert James Lindores, Christchurch (NZ)

(73) Assignee: Trimble Navigation Limited, Sunnyvale, CA (US)

(*) Notice: Subject to any disclaimer, the term of this patent is extended or adjusted under 35 U.S.C. 154(b) by 298 days.

(21) Appl. No.: 11/248,701

(22) Filed: Oct. 12, 2005

(65) Prior Publication Data

US 2007/0083299 A1 Apr. 12, 2007

(51) Int. Cl.
*G01C 21/34* (2006.01)

(52) U.S. Cl. ............... 701/210; 701/50; 701/202; 340/995.21

(58) Field of Classification Search ............. 701/50, 701/202, 209, 210, 213; 340/995.19, 995.21
See application file for complete search history.

(56) References Cited

U.S. PATENT DOCUMENTS

| | | | | |
|---|---|---|---|---|
| 6,064,926 | A * | 5/2000 | Sarangapani et al. | 701/26 |
| 6,141,614 | A * | 10/2000 | Janzen et al. | 701/50 |
| 7,256,388 | B2 * | 8/2007 | Eglington et al. | 250/221 |
| 7,277,792 | B2 * | 10/2007 | Overschie | 701/206 |
| 2006/0178820 | A1 * | 8/2006 | Eglington et al. | 701/209 |
| 2006/0178823 | A1 * | 8/2006 | Eglington et al. | 701/210 |
| 2006/0178825 | A1 * | 8/2006 | Eglington et al. | 701/211 |

* cited by examiner

*Primary Examiner*—Gary Chin

(57) ABSTRACT

Embodiments of the present invention recite a method and system for determining the path of a mobile machine. In one embodiment, a control component accesses a first path which comprises at least one curved portion. The control component then determines a second path which is substantially parallel with the first path and which comprises a second curved portion that corresponds to the at least one curved portion of the first path. The control component then amends said second path wherein a radius of the second curved portion is at least equal to a minimum turning radius of the mobile machine.

20 Claims, 8 Drawing Sheets

METHOD AND SYSTEM FOR DETERMINING THE PATH OF A MOBILE MACHINE

FIELD OF THE INVENTION

Embodiments of the present invention are generally directed to controlling a mobile machine.

BACKGROUND OF THE INVENTION

Operating agricultural vehicle such as tractors and harvesters often requires highly repetitive operations. Due to the repetitive nature of the work, and irregularities in the terrain, gaps and overlaps in the rows of crops can occur. This can result in damaged crops, overplanting, or reduced yield per acre. Additionally, it is often desirable for a vehicle to follow a set path pattern over an area, for example when planting a field, conducting a search, or to reproduce a previously created path pattern at a later date. For example, a field may be ploughed, then sowed or planted, fertilized, sprayed and harvested. Following the same path pattern over the field each time ensures that each subsequent action is targeted to the correct area. It is therefore known to pre-plan the paths that a vehicle will follow. As the size of agricultural vehicles and farming implements continues to increase, precisely controlling their motion becomes more important.

Guidance systems are increasingly used for controlling agricultural and environmental management equipment and operations such as road side spraying, road salting, and snow plowing where following a previously defined route is desirable. This allows more precise control of the vehicles than is typically realized than if the vehicle is steered by a human.

In one known method of planning a plurality of desired paths for a machine to traverse, the path planning system may receive information including the physical dimensions of the machine. A first reference path may be traced using position sensing means, and this path used to plan subsequent paths, which may be either straight or curved.

The perimeter of a work area may be established by driving the perimeter whilst generating positioning signals, storing the positioning signals and then planning a pattern of work paths to cover the area contained by the perimeter. The desired pattern can be chosen after considering factors which may include the area covered during one pass, the turning radius of the machine or the size of the work area. A GPS system is particularly appropriate for this application.

Projected paths may be used to guide a robotically controlled vehicle directly, or transmitted to an on-board display to be followed by a human operator. Systems of course-correction may be used to minimize cross-track and offset if the vehicle deviates from a pre-projected path. Gain tuning may also be applied to the auto-steering system in order to approximate the differences in human steering when the vehicle is traveling at different speeds.

However, the current systems for planning a path pattern encounter problems when the desired path follows a concave curve. For example, in subsequent parallel paths, the curve typically becomes progressively sharper until the radius of the planned turn is too sharp for the vehicle to physically perform. It may then become necessary for a driver to manually stop and turn the vehicle to realign it with the planned path pattern. Typically, this manually determined path correction is not reproducible at a later date.

There are known methods of determining whether a curve is too tight. In one method, when a curve is identified as being too tight, that path is abandoned, and a fresh one drawn. This results in complicated path patterns which are difficult to drive.

Another current method for planning a curved path projects a path by looking ahead of the current position either a set amount of time or distance and creating a heading based on the predicted location at that time. This is neither repeatable nor reliable.

SUMMARY OF THE INVENTION

Thus, it would be advantageous to provide a system and method of determining the path of a mobile machine which can be reliably repeated. Furthermore, it would be advantageous it the above stated system eliminated sharp turns from concave turns in the planned path to facilitate reproducing the planned path at a later time.

The present invention provides a method and system for determining the path of a mobile machine in which a planned path is checked to ensure that a curve or corner in the planned path has a radius that is at least equal to or greater than the predetermined minimum turning radius of the mobile machine. In embodiments of the present invention, the predetermined minimum turning radius may also account for an implement coupled with the mobile machine. In embodiments of the present invention, if a curve of the planned path has a radius less than the minimum turning radius, the planned path of the mobile machine is amended until the radius of that curve is at least equal to or greater the minimum turning radius of the mobile machine.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "determining," "amending," "utilizing," "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1A:
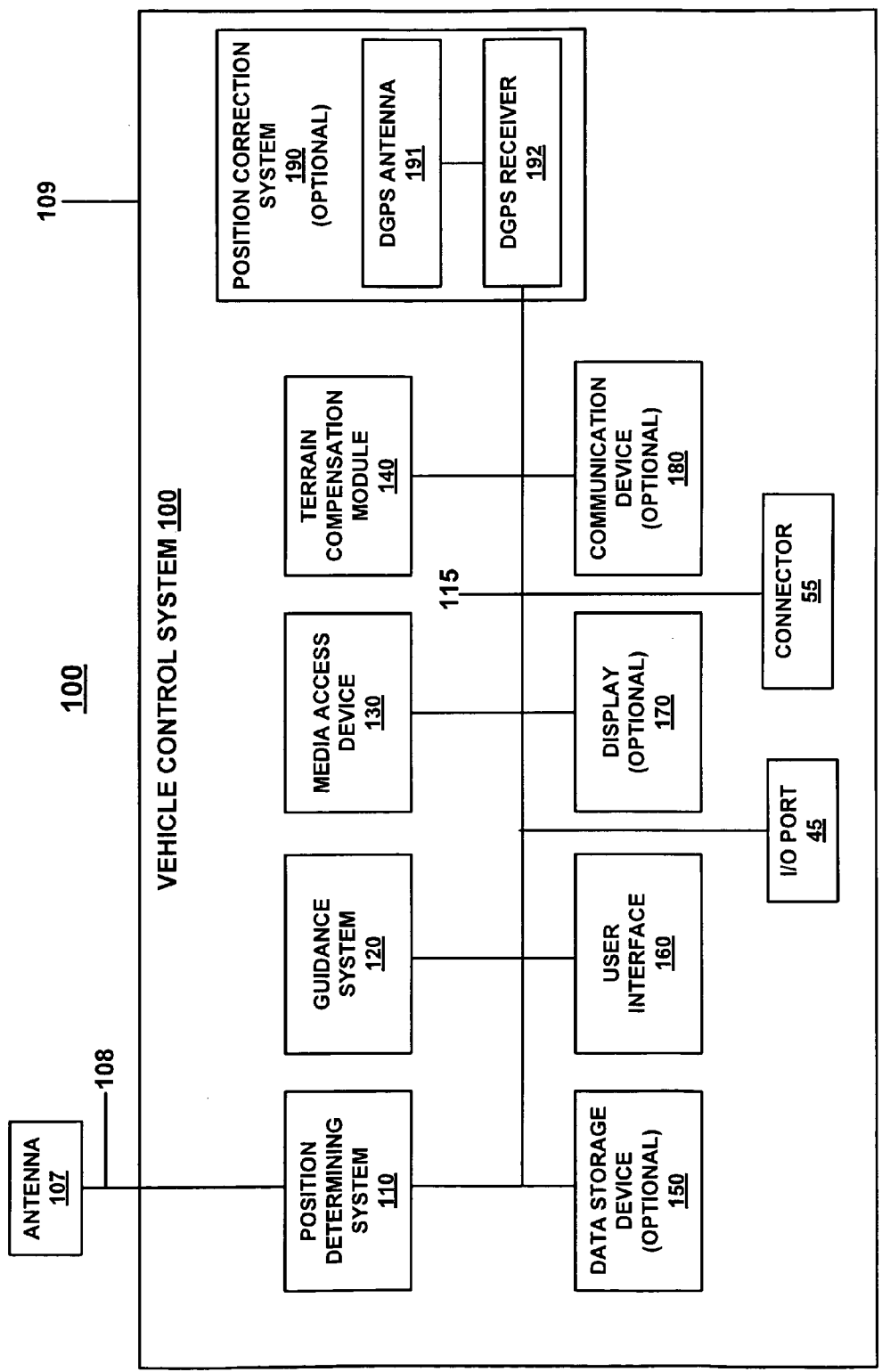
FIGS. 1A and 1B show an exemplary vehicle control system in accordance with embodiments of the present invention.
Figure 1B:
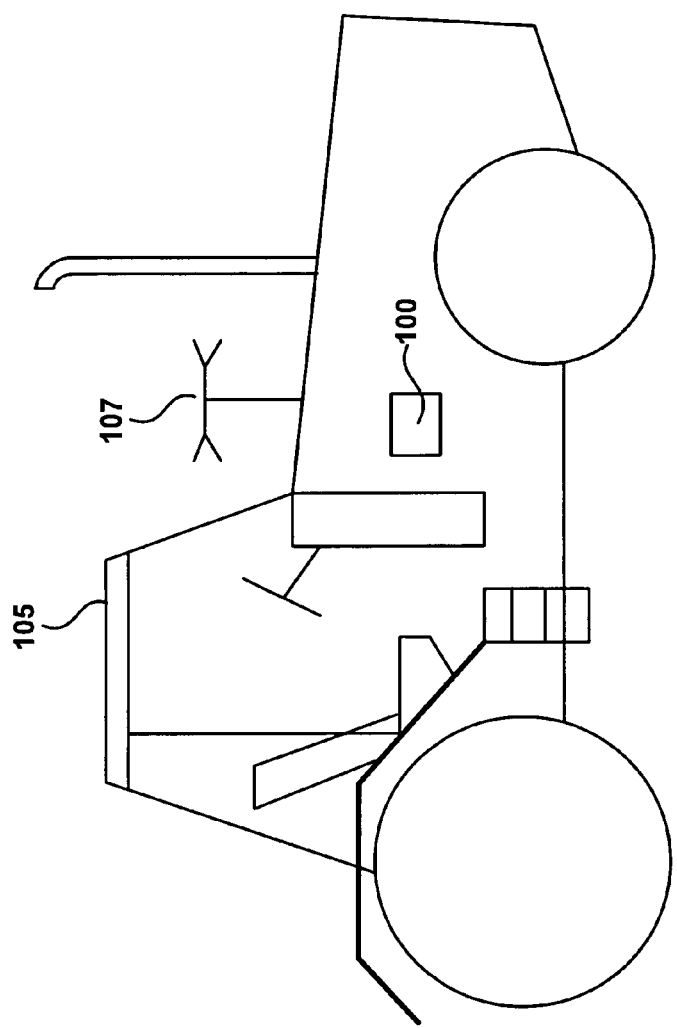

FIG. 1A illustrates a block diagram of an vehicle control system 100 in accordance with an embodiment of the present invention. In embodiments of the present invention, the vehicle control system 100 may be implemented as an integrated guidance system that can be mounted on the dash, windshield, or ceiling of a vehicle such as, a tractor. In one embodiment, vehicle control system 100 is integrated with a steering component (e.g., 230 of FIG. 2A) which may be coupled with the steering column or steering shaft of the mobile machine (e.g., 105 of FIG. 1B) being controlled and is operable for actuating the steering mechanism thereof. In other embodiments of the present invention, vehicle control system 100 may be implemented as a plurality of discreet components which are communicatively coupled in a network.

In accordance with embodiments of the present invention, vehicle control system 100 determines the geographic position of a vehicle or other mobile machine and determines whether the vehicle is traveling in a desired direction. Additionally, if the vehicle is not traveling in a desired direction, vehicle control system 100 determines a course correction for the vehicle and generates a steering command to implement the course correction. For the purposes of the present invention, the term "geographic position" means the determining in at least two dimensions (e.g., latitude and longitude), the location of a mobile machine (e.g., 105). Furthermore, for purposes of the present invention, the term "course correction" means a change in the direction traveled by the vehicle such that it is guided from a current direction of travel to a desired direction of travel.

Embodiments of the present invention facilitate controlling the steering of mobile machines, thus allowing more precise control of the machine than may be realized by a human operator under certain conditions. For example, a snowplow may operate under conditions in which a human operator's ability to see the road is diminished. Additionally, when performing highly repetitive tasks such as plowing a field, embodiments of the present invention facilitate controlling the vehicle more precisely, thus minimizing errors in controlling the vehicle which may result in gaps or overlaps in the field. Embodiments of the present invention are also well suited for reproducing a previously created path pattern at a later date. Furthermore, embodiments of the present invention are well suited for planning the path of the mobile machine that eliminates sharp turns from the planned path, and which is repeatable and reliable.

Again, it should be understood that vehicle control system 100 of the present invention can be utilized with a variety of mechanical systems that are capable of movement. Although the present discussion will focus on guidance of vehicles such as, for example, agricultural vehicles and equipment, the invention is not limited to the guidance and use on agricultural vehicles alone.

Referring again to FIG. 1A, the vehicle control system 100 includes a position determining system (PDS) 110, a guidance system 120, and a media access device 130 which are coupled via a bus 115. Additionally, a terrain compensation module (TCM) 140, an optional data storage device 150, and a user interface 160 are coupled with bus 115. Also, an optional display 170, an optional communication device 180, and an optional position correction system 190 are coupled with bus 115. In the embodiment of FIG. 1A, these components are disposed within a housing 109. Input/output (I/O) port 45 and connector 55 facilitate communicatively coupling vehicle control system 100 with other components such as the steering component described above (e.g. 230 of FIG. 2A). While the present embodiment shows these components disposed within housing 109, embodiments of the present invention are well suited to various combinations of these components. For example, in one embodiment, position determining system 110 and terrain compensation module 140 may be disposed within a housing (not shown) of antenna 107. In other embodiments of the present invention, vehicle control system 100 may be implemented as a plurality of discreet components which are communicatively coupled in a networked devices.

In one embodiment of the present invention, position determining system 110 is a satellite based position determining system and receives navigation data from satellites via antenna 107. Examples of satellite based position determining systems include the global positioning system (GPS) navigation system, a differential GPS system, a real-time kinematics (RTK) system, a networked RTK system, etc.

While the present embodiment recites these position determining systems specifically, it is appreciated that embodiments of the present invention are well suited for using other position determining systems as well such as ground-based position determining systems, or other satellite-based position determining systems such as the GLONASS system, the Global Navigation Satellite System (GNSS), the Radionavigation Satellite Service (RNSS), or the Galileo system currently under development.

In the embodiment of FIG. 1A, position determining system 110. utilizes a process of triangulation from several satellites, which are transmitting position determination signals, to determine the current position of the vehicle. The position determining system 110 is coupled with antenna 107 via a coupling 108. As shown in FIG. 1A, antenna 107 is disposed outside of housing 109 to facilitate mounting antenna 107 outside of the vehicle (e.g., mounted on the hood or roof of mobile machine 105) if, for example, the received GPS signals from the GPS satellites are not be strong enough inside the vehicle. However, in embodiments of the present invention, antenna 107 may also be disposed within housing 109. It should be understood that the position determining system 110 can be implemented to utilize position determination signals from other satellite-based systems, land-based systems, or hybrid (satellite-land) systems as well.

The accuracy of the current position of the vehicle determined by the position determining system 110 depends on factors such as time of the day, number of GPS satellites available, atmospheric conditions, accuracy of the components, etc. These factors can introduce errors in the determination of the current position of the vehicle.

A process known as differential correction can correct many of these errors. Differential GPS is an enhanced form of GPS. Differential GPS positions are more accurate than regular GPS positions. Differential GPS positions are regular GPS positions that have been corrected for atmospheric conditions and/or other errors using the process of differential correction. Typically, differential correction uses a GPS reference station, such as a GPS station that has a well-known location, to provide corrections for other GPS receivers that are at unknown locations (such as on a vehicle). Differential corrections may be applied second-by-second in real time. These are known as real-time differential corrections. Alternatively, differential corrections may also be stored in electronic files (e.g., in data storage device 150) and accessed later.

There are many sources of differential corrections. These sources include a short-range radio link from a local GPS reference station, a medium-range radio link from maritime or land-based beacons, and geo-stationary satellites. Geo-stationary satellites use multiple land-based reference stations to create a differential correction map over very large areas of the earth. One of these systems is the Wide Area Augmentation System (WAAS).

In an embodiment of the present invention, differential correction capability is integrated into the position determining system 110 of FIG. 1A. In the embodiment shown in FIG. 1A, the optional position correction system 190 provides the differential correction capability. As described above in an embodiment of the present invention, the position determining system 110 utilizes satellites of the Global Positioning System. Thus, the position correction system 190 includes a Differential Global Positioning System (DGPS) receiver 192 for correcting errors in the GPS position using GPS differential corrections, a DGPS antenna 191 for receiving GPS differential correction signals. In embodiments of the present invention, DGPS antenna 191 and DGPS receiver 192 may be coupled via a cable to facilitate positioning DGPS antenna 191 outside of the vehicle or, as shown in FIG. 1A, disposed within housing 109.

As will be discussed in greater detail below, guidance system 120 uses position data from position determining system 110, user input (e.g., a desired pattern or direction), as well as vector data such as desired direction and distance to determine course corrections which are used for guiding mobile machine 105. Furthermore, guidance system 120 is further for reproducing a previously created path pattern at a later time and for planning a path for mobile machine 105 that eliminates sharp turns from the planned path, and which is both repeatable and reliable.

In embodiments of the present invention, media access device 130 facilitates accessing data from removable media storage devices. Examples of removable media storage devices accessible in accordance with embodiments of the present invention include, but are not limited to, floppy disks, optical media storage devices (e.g., compact disks (CDs) and digital versatile disks (DVDs), and flash memory devices such as Secure Digital Input/Output (SDIO) cards, CompactFlash memory devices, MultiMediaCard memory devices, SmartMedia memory devices, or other integrated circuit memory devices. More generally, media access device 130 is for accessing digital data stored on a removable media storage device.

TCM 140 provides the ability to compensate for terrain variations which can reduce the precision of position determining system 110 in determining the geographic position of a vehicle. For example, when traversing a hillside, the antenna 107 can be displaced to one side or the other with respect to the center line of mobile machine 105, thus causing errors in determining its geographic position. As a result, gaps or overlaps can occur when plowing across contoured terrain is being performed. TCM 140 can detect the magnitude of displacement of antenna 107 with respect to the center line of mobile machine 105 (e.g., due to roll, pitch, and yaw) and send signals which allow guidance system 120 to generate steering commands which compensate for the errors in determining the geographic position. In embodiments of the present invention, TCM 140 may utilize gyroscopes, accelerometers, tilt sensors, rotation sensors, and the like to determine the displacement of antenna 107 from a first position to a second position with respect to the centerline of mobile machine 105.

Because vehicle control system 100 may be coupled with a vehicle using, for example, suction cups, it may be beneficial to calibrate TCM 140 prior to operating system 100. For example, if vehicle control system 100 is tilted when the system is started up, a bias may be induced which prevents TCM 140 from accurately determining the offset of antenna 107 from the centerline of the vehicle. In one embodiment, a circular level may be fixedly mounted in the vehicle in a location which can be seen by the vehicle operator. The vehicle can be parked at a level area and the circular level adjusted to indicate that the vehicle is level. The mounting hardware for the circular level can then be tightened to prevent the circular level from being tilted. A second circular level can be mounted on vehicle control system 100. When the circular level in the vehicle shows that the vehicle is parked in a level area, a user can manually change the mounting angle of vehicle control system 100 so that the circular level mounted thereupon indicates that the integrated guidance system is also level.

In another embodiment, the levels indicate the magnitude of the tilt of the vehicle of the vehicle control system 100. When the level mounted in the vehicle indicates, for example, a tilt of five degrees to the left, the vehicle operator can tilt integrated guidance system five degrees to the left as well. As a result, both the vehicle and vehicle control system 100 are tilted in a similar direction and magnitude.

In another embodiment, an electronic auto-level (not shown) may be coupled or built into vehicle control system 100 which automatically removes bias induced by the mounting angle of vehicle control system 100. To check whether tilt-induced bias has been removed, an operator can drive the vehicle over the same ground in opposite directions. If there is no tilt-induced bias, the wheels of the vehicle should substantially traverse the same wheel tracks as in the previous pass. If there is a mis-alignment of vehicle control system 100 due to tilt, antenna 107 will not be in the expected position. As a result, the vehicle will follow different paths when successive passes are made across the same ground.

In embodiments of the present invention, optional data storage device 150 may comprise a volatile memory random access memory (RAM) for storing the digital information and instructions, or non-volatile data storage device such as a hard disk drive, flash memory or other optical or magnetic storage device. Data storage device 150 can be used to store digital information and instructions such as the curve smoothing method of the present invention. It should be noted that the software program for performing the curve smoothing method of the present invention can also be stored in removable media storage devices accessible by media access device 130. In embodiments of the present invention, data storage device 150 may be remotely located from vehicle control system 100. For example, communication device 180 may be a radio transceiver or cellular telephone device which can wirelessly transmit data from vehicle control system 100 to a remotely located data storage device 150 (e.g., via the Internet).

In embodiments of the present invention, data storage device 150 may also be used to log or record information such as field boundaries, road pathways, or where the vehicle has previously gone. This last function is particularly useful because records must be kept regarding the application of chemicals or fertilizers to, for example, farm fields in order to comply with environmental regulations. Embodiments of the present invention facilitate logging this information for later retrieval.

In embodiments of the present invention, the user interface 160 is adapted for enabling an operator to access and interact with any one of the available functions of the vehicle control system 100 with a minimum number of inputs and with minimum use of the inputs. An "input" refers to a button, key, switch, or any other electronic or mechanical means for a user to communicate information such as, for example, data, a command, a selection or a choice, to an electronic device. In an embodiment, the user interface 160 may comprise a plurality of buttons. In another embodiment, user interface 160 may comprise an alpha-numeric keypad and/or a device for controlling a cursor displayed upon display device 170. Examples of cursor control devices include, but are not limited to, a trackball, mouse, touch pad, joystick, or special keys on the alpha-numeric keypad. In other embodiments, a voice recognition system (not shown) may be used to facilitate input of commands without requiring a user to operate user interface with his/her hands.

In embodiments of the present invention, user interface 160 is conveniently positioned and integrated with respect to housing 109 for easy access by an operator. As a result, an operator can use without difficulty the vehicle control system 100 while operating the vehicle, since distractions (e.g., too many inputs to select, position of the inputs is not convenient, need for visual assistance to distinguish inputs, etc.) originating from using the user interface by other guidance systems are significantly reduced.

In embodiments of the present invention, display 170 comprises a display device for displaying text and graphics. In an embodiment, the display device 170 may be, but is not limited to, a liquid crystal display (LCD). In anther embodiment, display 170 may comprise a touch panel display (e.g., using resistive, capacitive, inductive, or pressure sensitive input detection) to facilitate input of data such as user touch screen commands. The display device 170 can be implemented with other display technologies. Moreover, the display device 170 is compact to minimize obstructing the vision of the operator and to reduce the size of the vehicle control system 100.

In embodiments of the present invention, display device 170 may generate a lightbar display that is adapted for providing a visual representation of a deviation of the current position of the vehicle from a desired path to guide an operator in controlling movement of the vehicle along the desired path. Typically, the lightbar comprises a light pattern that indicates the deviation of the vehicle from the desired path. It should be understood that in embodiments of the present invention, the lightbar may be implemented as a plurality of discreet light emitting elements that are separate from display device 170.

In embodiments of the present invention, vehicle control system 100 can be coupled with steering component 230 via the I/O port 45. Moreover, vehicle control system 100 can have one or more I/O ports 45, thus facilitating the downloading and uploading of data. In an embodiment, the I/O port 45 is a serial port which is compliant with, but not limited to, the controller area network (CAN) protocol. CAN is a serial bus system which was developed for automotive use in the early 1980s. The Society of Automotive Engineers (SAE) has developed a standard CAN protocol, SAE J1939, based upon CAN specification 2.0. The SAE J1939 specification provides plug-and-play capabilities and allows components from various suppliers to be easily integrated in an open architecture. It is noted that in embodiments of the present invention, discreet components of vehicle guidance system 100 may be communicatively coupled using a CAN bus. For example, position determining system 110, guidance system 120, and steering component 230 may be communicatively coupled using a CAN bus in embodiments of the present invention. It is appreciated that other discreet components of vehicle guidance system 100 may also be coupled using the CAN bus as well.

In the embodiment of FIG. 1A, connector 55 is for conveying electrical power from mobile machine 105 to vehicle control system 100. However, it is appreciated that in another embodiment, vehicle control system may be powered by internal batteries (not shown).

Figure 2A:
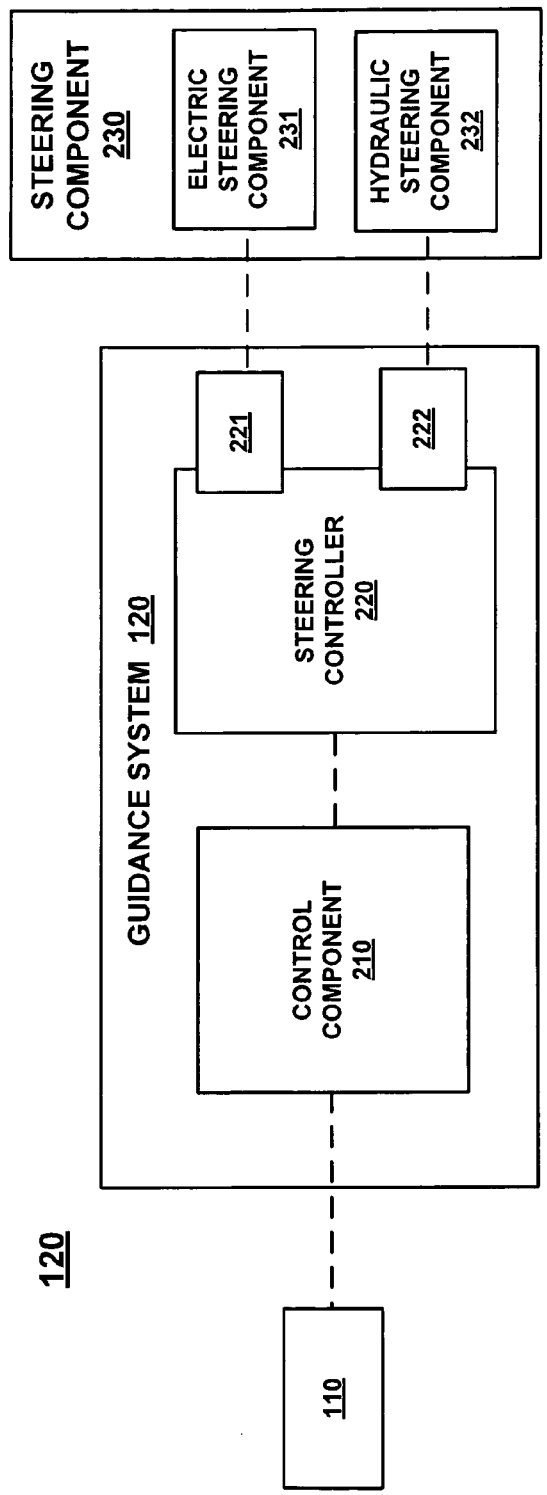
FIG. 2A is a block diagram of an exemplary guidance system in accordance with embodiments of the present invention.

FIG. 2A is a block diagram of an exemplary guidance system 120 in accordance with embodiments of the present invention. In the embodiment of FIG. 2A, guidance system 120 comprises a control component 210 which is coupled with an optional steering controller 220. It is appreciated that in embodiments of the present invention, control component 210 may be implemented as a single unit separate from steering controller 220, or as an integrated unit as shown in FIG. 2A.

In embodiments of the present invention, control component 210 uses position data from position determining system 110, user input such as a desired pattern or direction, as well as vector data such as desired direction and distance to determine course corrections which are used for guiding mobile machine 105. In embodiments of the present invention, roll, pitch, and yaw data from TCM 140 may also be used to determine course corrections for mobile machine 105. In embodiments of the present invention, guidance system 120 is a commercially available guidance system such as, for example, the AgGPS® guidance system, or the EZ-Guide® system, both of which are manufactured by Trimble Navigation Ltd. of Sunnyvale Calif.

Additional data used to determine course corrections may also comprise swath calculation which takes into account the width of various implements which may be coupled with mobile machine 105. For example, if a harvester can clear a swath of 15 feet in each pass, control component 210 may generate commands which cause mobile machine 105 to follow a path 15 feet to one side of the preceding swath in the next pass. Control component 210 may also be programmed to follow straight or curved paths which is useful when operating in irregularly shaped or contoured fields or in fields disposed around a center pivot. This is also useful in situations in which the path being followed by mobile machine 105 is obscured. For example, an operator of a snowplow may not be able to see the road being cleared due to the accumulation of snow on the road. Additionally, visibility may be obscured by dust, snow, rain, or fog. Thus, it would be advantageous to utilize embodiments of the present invention to guide mobile machine 105 in these conditions.

In embodiments of the present invention, the course correction calculated by control component 210 is sent from control component 210 to steering controller 220. Steering controller 220 translates the course correction generated by guidance system 210 into a steering command for manipulating the steering mechanism of mobile machine 105. Steering controller 220 generates a message conveying the steering command to steering component 230. In embodiments of the present invention, the communicative coupling between control component 210, steering controller 220 and steering component 230 is accomplished using coupling I/O port 42 (e.g., a serial bus, or CAN bus).

In embodiments of the present invention, steering component 230 may comprise an electric steering component 231, or a hydraulic steering component 232. Thus, as shown in FIG. 2A, steering controller 220 comprises a first output 221 for coupling steering controller 220 with electric steering component 231, and a second output 222 for coupling steering controller 220 with hydraulic steering component 232. Because coupling 115 may be compliant with the CAN protocol, plug and play functionality is facilitated in system 200. Therefore, in embodiments of the present invention, steering controller can determine which steering component it is coupled with depending upon which output of steering controller 220 is used.

Steering controller 220 then generates a message, based upon the steering component with which it is coupled, which causes the steering component to actuate the steering mechanism of mobile machine 105. For example, if steering controller 220 determines that output 221 is being used, it generates a steering command which is formatted for controlling electric steering component 231. If steering controller 220 determines that output 222 is being used, it generates a steering command which is formatted for controlling hydraulic steering component 232.

Figure 2B:
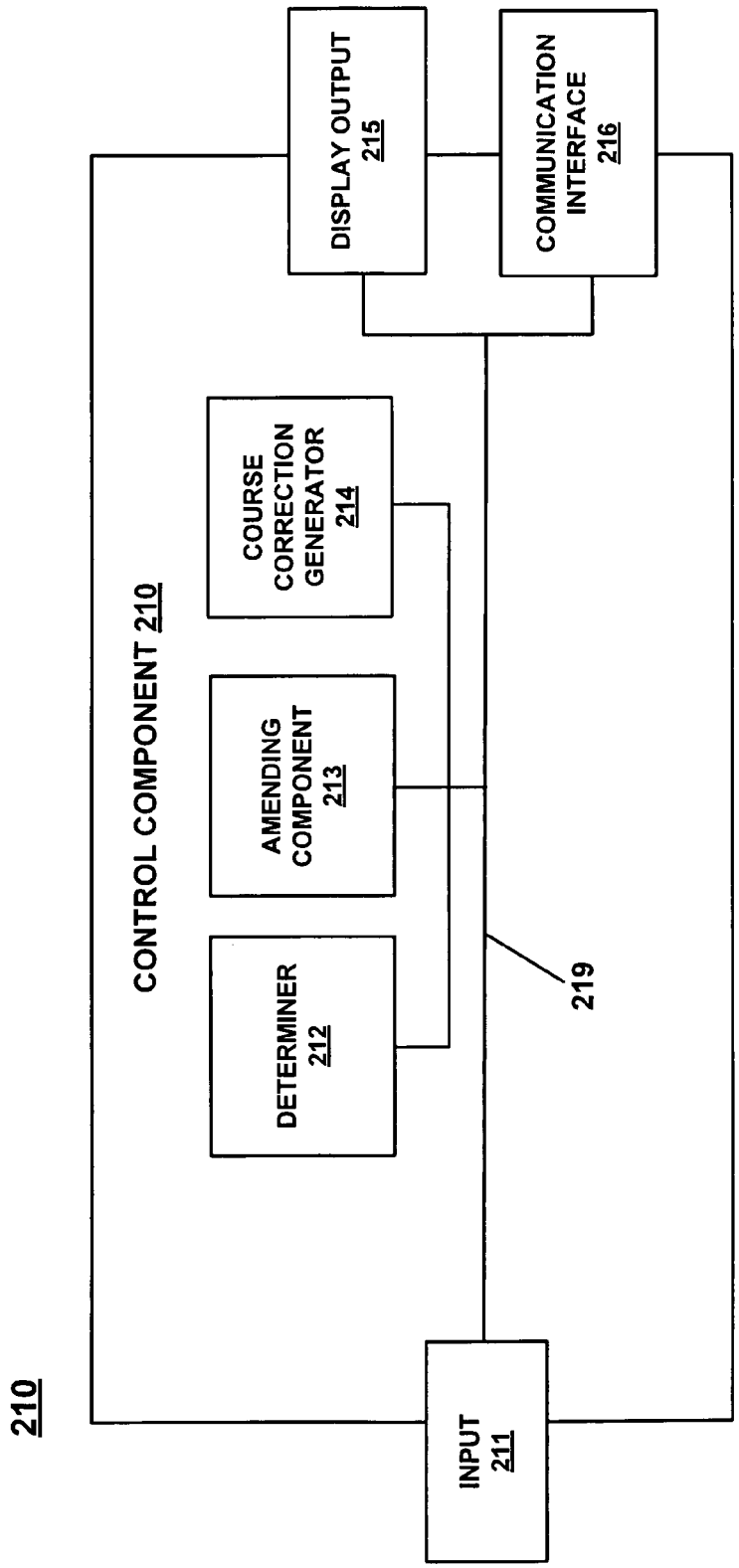
FIG. 2B is a block diagram of an exemplary control component in accordance with embodiments of the present invention.

FIG. 2B is a block diagram of an exemplary control component 210 in accordance with embodiments of the present invention. In FIG. 2B, control component 210 comprises an input 211 which is coupled with a determiner 212, an amending component 213, a course correction generator 214 via a bus 219. A display output 215 and a communication interface 216 are also coupled with communicative coupling 219. In embodiments of the present invention, input 211 is communicatively coupled with bus 115 of FIG. 1A. Thus, control component 210 may directly receive geographic position data generated by position determining component 110 via input 211. In embodiments of the present invention, control component 210 can access a first path (e.g., stored geographic data describing the first path, or real-time geographic position data generated as mobile machine traverses the first path).

In embodiments of the present invention, control component 210 may also access the minimum turning radius ($r_{min}$) of mobile machine 105 via input 211. The minimum turning radius may be manually input by an operator or mobile machine 105, may be digitally stored in a data file. In embodiments of the present invention, the minimum turning radius ($r_{min}$) may be a function of one or more implements that are coupled with mobile machine 105. Thus, ($r_{min}$) may be set to, for example, (80%) of the width of the implement coupled with mobile machine 105.

In embodiments of the present invention, determiner 212 is for determining a second path which is substantially parallel with the first path. In one embodiment the second path is substantially parallel to the first path, and may be spaced from the input path by a distance equal to the width of the implement coupled with mobile machine 105, or by the width of mobile machine 105 itself. One known technique which may be employed is to draw a normal to the first path at intervals along the input path, and mark a point (e.g., one implement width from the first path) along each normal, then to join those points together.

In embodiments of the present invention, determiner 212 may also determine whether a curved portion of the second path is at least equal to, or greater than, the minimum turning radius ($r_{min}$) of mobile machine 105. In one embodiment, a circle is fitted to the second curved portion using standard circle-fitting techniques. The radius of the fitted circle is compared to minimum turning radius ($r_{min}$) of mobile machine 105. If the radius of the fitted circle is less than the minimum turning radius of mobile machine 105, the second path will then be amended by amending component 213.

In embodiments of the present invention, if a curved portion of the second path has a radius less than the minimum turning radius ($r_{min}$) of mobile machine 105, amending component 213 alters the geometry of the second path so that the radius of the curved portion being analyzed is at least equal to, or greater than, the minimum turning radius ($r_{min}$) of mobile machine 105. In embodiments of the present invention, each detected curved portion of a path generated by determiner 211 is examined. In other embodiments of the present invention, a parameter may be accessed that defines which curved portions of the second path are to be analyzed. For example, a curve or turn may be defined as a change in the heading of the path by at least 30° over a distance of 100 meters.

In embodiments of the present invention, upon amending the second path of mobile machine 105, course correction generator 214 generates a course correction which is conveyed to steering controller 220 via communication interface 216. As described above, embodiments of the present invention may be utilized for causing mobile machine 105 to automatically follow the second path once it is determined that it does not comprise any curved portions whose radius is less than the minimum turning radius ($r_{min}$) of mobile machine 105. Steering controller 220 then generates signals or messages to steering component 230 which actuate the steering mechanism of mobile machine 105 and cause it to automatically follow the second path.

In another embodiment, mobile machine 105 may not be equipped with automatic steering control equipment (e.g., steering controller 220 and steering component 230). Thus, in embodiments of the present invention, a visual indication may be sent from control component 210 via display output 215 to display 170 of FIG. 1A. As described above, display 170 may provide an operator with a visual indication of a deviation of mobile machine 105 from a desired direction. In embodiments of the present invention, a lightbar may indicate the direction of deviation from the desired direction, or be used to indicate which direction to steer toward in order to again be driving on the second path. In another embodiment, this information may be displayed on a display screen (e.g., a liquid crystal display device of display 170). It is noted that the second path determined by control component 210 may be stored in data storage device 150, stored on removable media using media access device 130, or transmitted via communication device 180. Furthermore, it is noted that the function of components described above may be combined in a single functional module such as a dedicated processor of control component 210.

Figure 3:
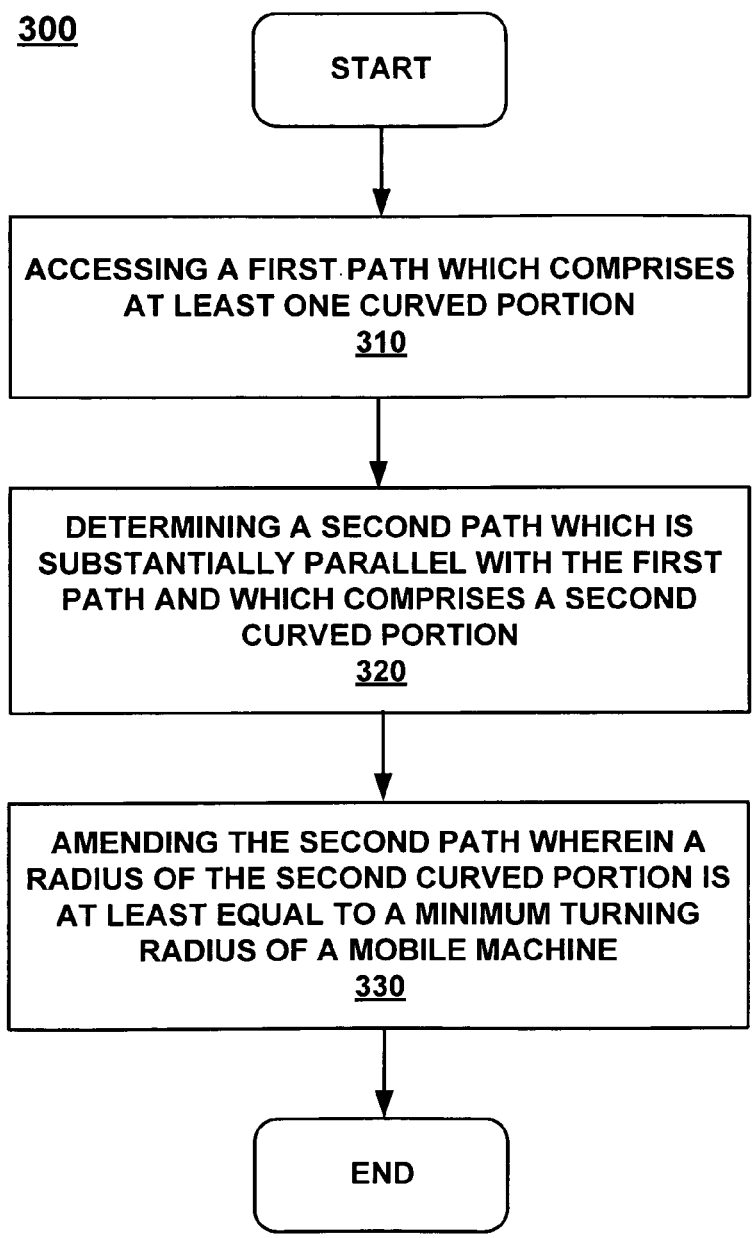
FIG. 3 is a flow chart of a method of determining the path of a mobile machine in accordance with embodiments of the present invention.

FIG. 3 is a flow chart of a method 300 of determining the path of a mobile machine in accordance with embodiments of the present invention. In step 310 of FIG. 3, a first path which comprises at least one curved portion is accessed. In embodiments of the present invention, accessing the first path may comprise accessing a digitally stored route or path. For example, the first path may be geographic position and direction data accessed via media access device 130, data storage device 150, or downloaded using communication device 180 (e.g., via the Internet). In another embodiment, the first path may be accessed when mobile machine 105 is driven along the first path while position determining system 110 generates geographic position data describing intervals along the first path. Vehicle control system 100 then records this geographic position data of the first path.

In step 320 of FIG. 3, a second path which is substantially parallel with the first path and which comprises a second curved portion is determined. As will be described in greater detail below, guidance system 120 then determines a second path for mobile machine 105 that is substantially parallel with the first path accessed above with reference to step 310. As a result, a second curved portion that corresponds to the first curved portion of the first path is created when the second path is determined. In embodiments of the present invention, the second path may be offset from the first path by the width of an implement (e.g., a plow) coupled with mobile machine 105, or by the width of mobile machine itself.

In step 330 of FIG. 3, the second path is amended wherein a radius of the second curved portion is at least equal to a minimum turning radius of a mobile machine. In embodiments of the present invention, the minimum turning radius of mobile machine 105 is used as a parameter for determining whether the second curved portion of the second path is too sharp for mobile machine 105 to perform. In embodiments of the present invention, the minimum turning radius for mobile machine may be affected by an implement (e.g., a plow) or implements that are coupled with mobile machine 105. The minimum turning radius of mobile machine may comprise a pre-determined parameter, or may be manually input by an operator using, for example, user interface 160 of vehicle control system 100.

As described above, in embodiments of the present invention, guidance system 120 analyzes the second curved portion of the second path by fitting a circle corresponding to the second curved portion using standard circle-fitting techniques. The radius of the fitted circle is compared to minimum turning radius of mobile machine 105. If the radius of the fitted circle is less than the minimum turning radius of mobile machine 105, the second path is then amended by guidance system 120. Typically, the curved portion being analyzed is amended so that it is at least equal to, or greater than, the minimum turning radius of mobile machine 105. In so doing, embodiments of the present invention facilitate determining subsequent paths which can be performed by mobile machine 105. Furthermore, the subsequent paths determined by embodiments of the present invention may be stored for later use. Thus, embodiments of the present invention facilitate reliable reproduction of previously created routes and paths which can be used as navigation aids for operators of mobile machine 105.

In embodiments of the present invention, vehicle guidance system 120 may comprise control component 210 alone. Thus, in one embodiment, steering cues may be displayed to an operator of mobile machine 105. For example, a lightbar display (e.g., 170 of FIG. 1A) may provide a visual representation of a deviation of the current position of mobile machine 105 from a desired direction. Using this information, the operator can then affect a course correction for mobile machine 105 to reduce the deviation from the desired direction.

In another embodiment, guidance system 120 further comprises steering controller 220 which is operable for generating signals that control the steering mechanism of mobile machine 105. Based upon steering commands generated by control component 210, steering controller 220 generates signals that actuate the steering mechanism of mobile machine 105 to implement course corrections automatically.

Figure 4:
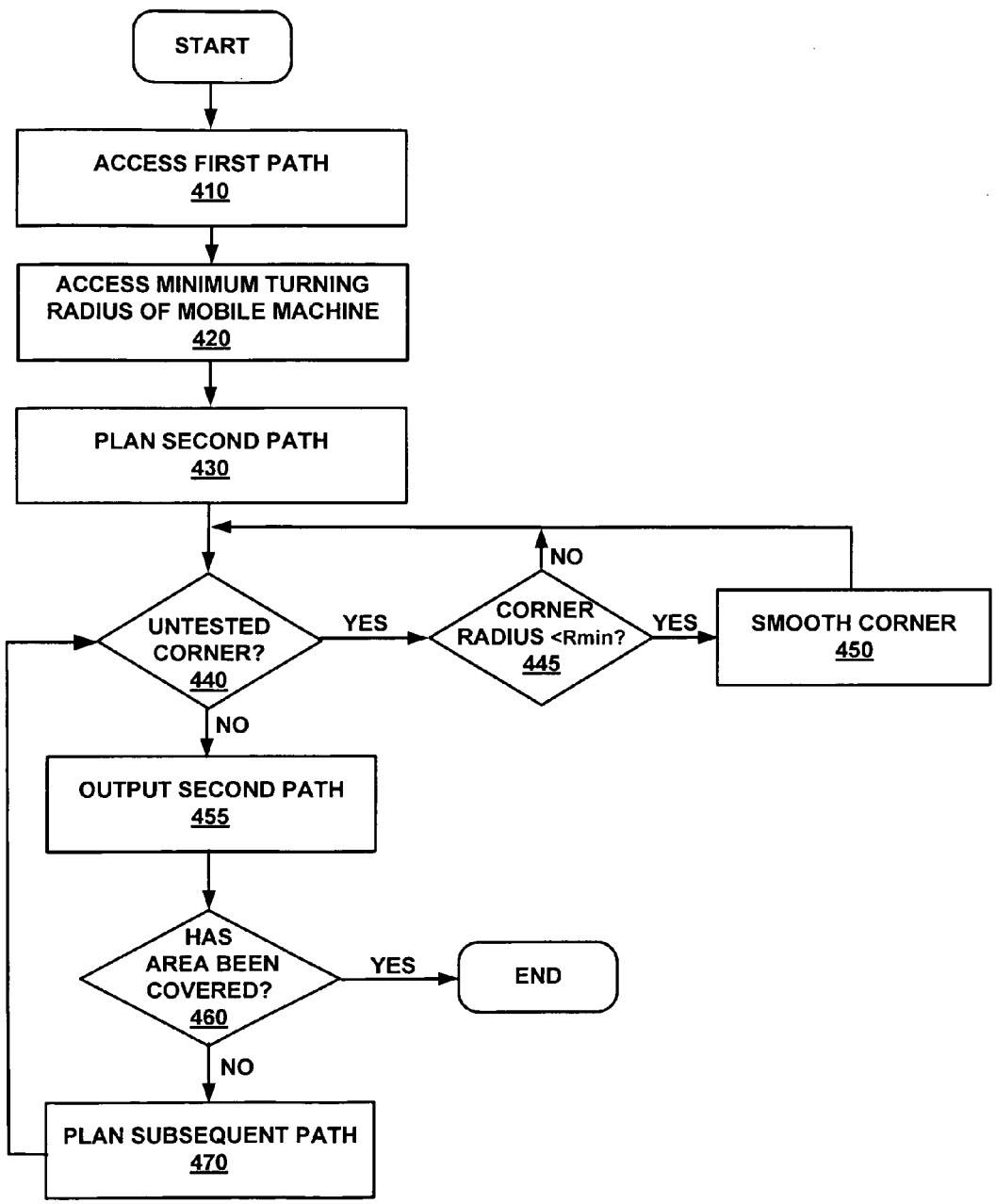
FIG. 4 is a flow chart showing in greater detail one implementation of a method of determining the path of a mobile machine in accordance with embodiments of the present invention.

FIG. 4 is a flow chart showing in greater detail one implementation of a method 400 of determining the path of a mobile machine in accordance with embodiments of the present invention. In step 410 of FIG. 4, a first path is accessed. As described above, in embodiments of the present invention the first path may comprise digitally created or stored geographic data. In another embodiment of the present invention, an operator of mobile machine 105 drives along the first path under manual control and system 100 records geographic position data describing the first path. In embodiments of the present invention, method 400 then proceeds to step 420.

In step 420 of FIG. 4, the minimum turning radius ($r_{min}$) of a mobile machine is accessed. In embodiments of the present invention, the operator of mobile machine 105 may manually enter this information, or it may be accessed from media access device 130, data storage device 150, or communication device 180. In embodiments of the present invention, the minimum turning radius ($r_{min}$) of mobile machine 105 may be a function of one or more implements that are coupled with mobile machine 105. Thus, the operator of mobile machine 105 may input the width of the implement into system 100 via user interface 160 and system 100 will automatically set the minimum turning radius ($r_{min}$) to, for example, (80%) of the width of the implement coupled with mobile machine 105. In embodiments of the present invention, method 400 then proceeds to step 430.

In step 430 of FIG. 4, a second path is planned. In embodiments of the present invention, system 100 uses the geographic position data of the first path to determine a second path that is substantially parallel with the first path. In embodiments of the present invention, the second path may be offset from the first path by the width of mobile machine 105, or an implement coupled therewith. As described above, in one embodiment a normal to the first path is drawn at intervals along the first path, and a point (e.g., one implement width from the first path) along each normal, then to join those points together. In embodiments of the present invention, method 400 then proceeds to step 440.

In step 440 of FIG. 4, a logical operation is performed to determine whether a corner, or curved portion, of the second path has been tested. In embodiments of the present invention, a corner may be defined as a heading change of thirty degrees (30°) or more over a distance of 100 meters. It is noted that this may be a pre-determined value, or may be input by a user. Furthermore, the parameters defining the corner may be different than those cited above. In the embodiment of FIG. 4, when a corner is detected, system 400 determines whether that the corner has been tested to determine whether mobile machine 105 can turn that corner. If it is determined that the corner is untested, method 400 proceeds to step 445. If it is determined that there are no untested corners in the second path, method 400 proceeds to step 455.

In step 445 of FIG. 4, a comparison between the radius of the fitted circle and the minimum turning radius of the mobile machine is performed. In one embodiment of the present invention, a circle is fitted to a corner or curved portion of the second path using standard circle fitting techniques. The radius of the fitted circle is then compared to the minimum turning radius ($r_{min}$) of mobile machine 105 described above. If the radius of the fitted circle is at least equal to, or greater than, the minimum turning radius ($r_{min}$) of mobile machine 105, method 400 returns to step 440. If the radius of the fitted circle is less than the minimum turning radius ($r_{min}$) of mobile machine 105, method 400 proceeds to step 450.

In step 450 of FIG. 4, the corner is smoothed as described above with reference to FIG. 2B. In one embodiment, the second path is amended so that the corner being analyzed is at least equal to, or less than, the minimum turning radius ($r_{min}$) of mobile machine 105. After the second path has been amended, method 400 returns to step 440 to determine if there are any untested corners or curved portions in the second path.

In step 455 of FIG. 4, the second path is output. In the embodiment of FIG. 4, once it is determined that there are no untested curved portions or turns in the second path, the second path is output. While the present embodiment recites outputting the second path after amending one or more curved areas, embodiments of the present invention are not limited to this method alone. For example, in another embodiment, subsequent paths (e.g., 612, 613, 614, 615, and 616 of FIG. 6) may be determined for mobile machine 105 prior to outputting the second path 607. In the embodiment of FIG. 4, after the second path has been output, method 400 proceeds to step 460.

In step 460 of FIG. 4, a logical operation is performed to determine whether the entire region being covered has been analyzed. In embodiments of the present invention, the boundaries of a field or other area being plotted are accessed. If it is determined that there is insufficient space to plot another path for mobile machine 105 (e.g., based upon the width of mobile machine 105 or an implement coupled therewith), method 400 ends. If it is determined that there is sufficient space to plot another path, method 400 proceeds to step 470.

Figure 5:
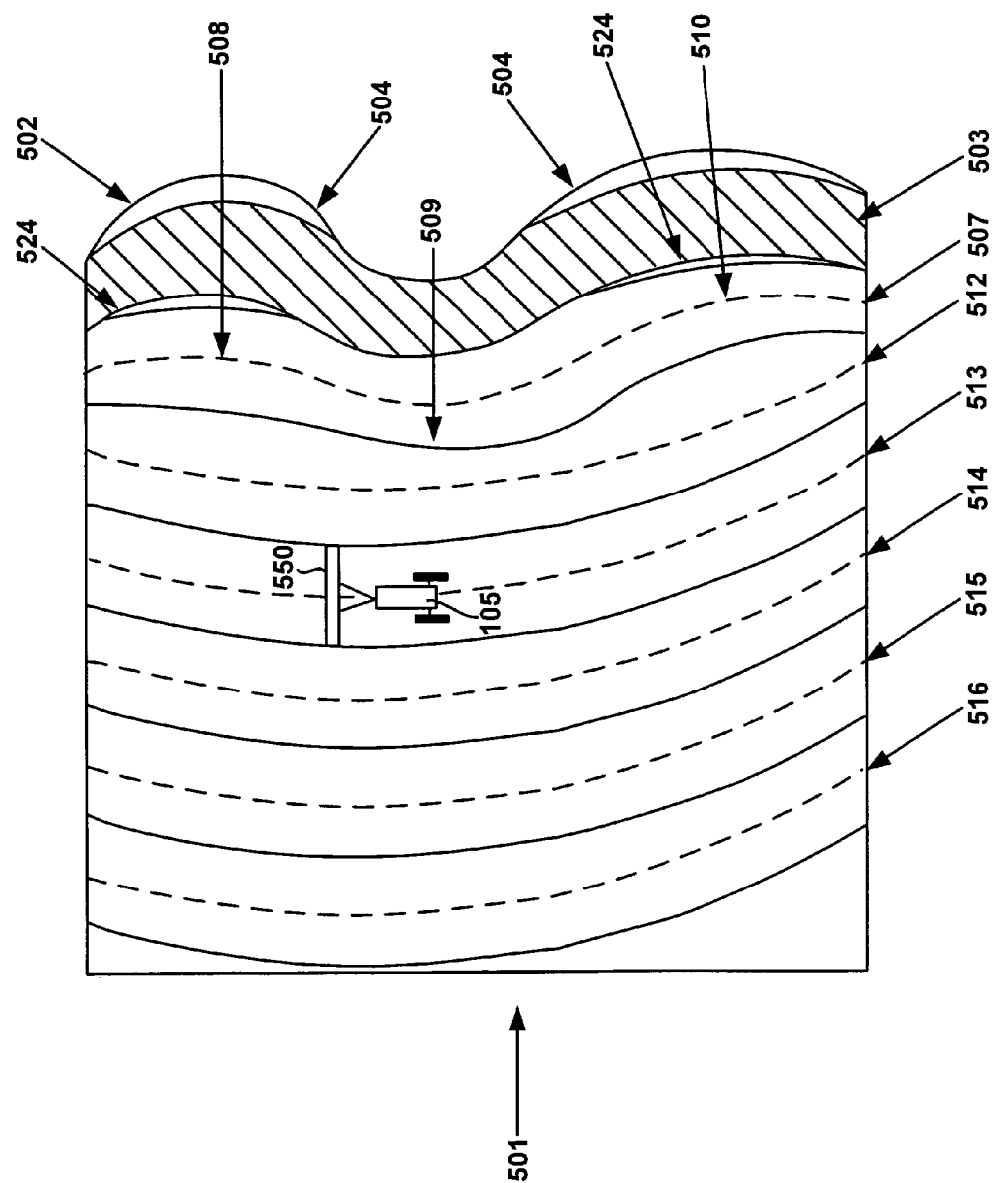
FIG. 5 shows a work area and a plurality of paths plotted in accordance with embodiments of the present invention.

In step 470 of FIG. 4, a subsequent path is planned. In embodiments of the present invention, after the second path has been planned and analyzed, a subsequent path is planned for mobile machine 105 and method 400 returns to step 440 to determine whether any corner or curved portion of the subsequent path remains untested. In embodiments of the present invention, method 400 is repeated until all of work area 401 has been FIG. 5 shows a work area 501 and a plurality of paths plotted in accordance with embodiments of the present invention. In FIG. 5, a field 501 has a curved boundary 502 on one side (e.g., a stream boundary). In FIG. 5, the swath boundaries are shown in solid lines, and the planned paths for mobile machine 105 are shown in broken lines.

With reference to step 410 of FIG. 4, the driver drives mobile machine 105 along an initial input path 503 along the curved boundary 502. Due to the turning radius of mobile machine 105, it may be necessary to "cut" certain corners, resulting in un-worked areas 504 of work area 501.

With reference to step 420 of FIG. 4, the driver inputs the width of an implement (e.g., 550) coupled with mobile machine 105 into system 100. In one embodiment, system 100 sets the minimum turning radius ($r_{min}$) to eighty percent (80%) of the width of implement 550.

With reference to step 430 of FIG. 4, system 100 plans a second path 507, which is parallel to first path 503.

With reference to step 440 of FIG. 4, system 100 detects a first corner 508 of second path 507, and proceeds to step 445 of FIG. 4. However, since the radius of the circle fitted to corner 508 is greater than the value of $r_{min}$ for mobile machine 105, system 100 returns to step 440.

Repeating step 440 of FIG. 4, system 100 detects a second corner 509, and proceeds to step 445 of FIG. 4. Since the radius of the circle fitted to corner 509 is less than the value of $r_{min}$ for mobile machine 105, system 100 proceeds to step 450 and smoothes the corner 509 using a curve smoothing algorithm. System 100 then returns to step 440 to determine if there are additional curves or turns in path 507 that have not yet been analyzed.

Repeating step 440 of FIG. 4, a third corner 510 is detected, and steps 445 and 450 are repeated, as for the first corner 508. It is noted that the smoothing process may result in additional un-worked areas 524 of work area 501.

In the present embodiment, repeating step 440 reveals no further corners in second path 507, and system 100 proceeds to step 455 and outputs the second path 507. In embodiments of the present invention, step 455 may comprise displaying path 507 on display 170, generating steering cues (e.g., using a lightbar display of display 170, or by generating messages for controlling the steering mechanism of mobile machine 105 in response to course corrections generated by guidance system 120. As described above with reference to FIG. 4, in embodiments of the present invention, system 100 may plot subsequent paths (e.g., 612, 613, 614, 615, and 616) for the entirety of work area 501 prior to outputting the second path (e.g., 507) for mobile machine 105.

Returning to FIG. 5, second path 507 is driven, and the driver realigns the mobile machine 105 to the approximate position of the second path 507. When the location of mobile machine 105 is approximately one implement width away from the first path 503, the system repeats steps 410-460, and uses second path 507 as the input path for determining a subsequent path (e.g., 512). In embodiments of the present invention, the driver may utilize visual cues output by system 100 (e.g., a lightbar or steering cue of display 170) in order to align mobile machine 105 with second path 507 and to follow second path 507. In another embodiment, mobile machine 105 may be automatically steered along second path 507 using system 100.

Figure 6:
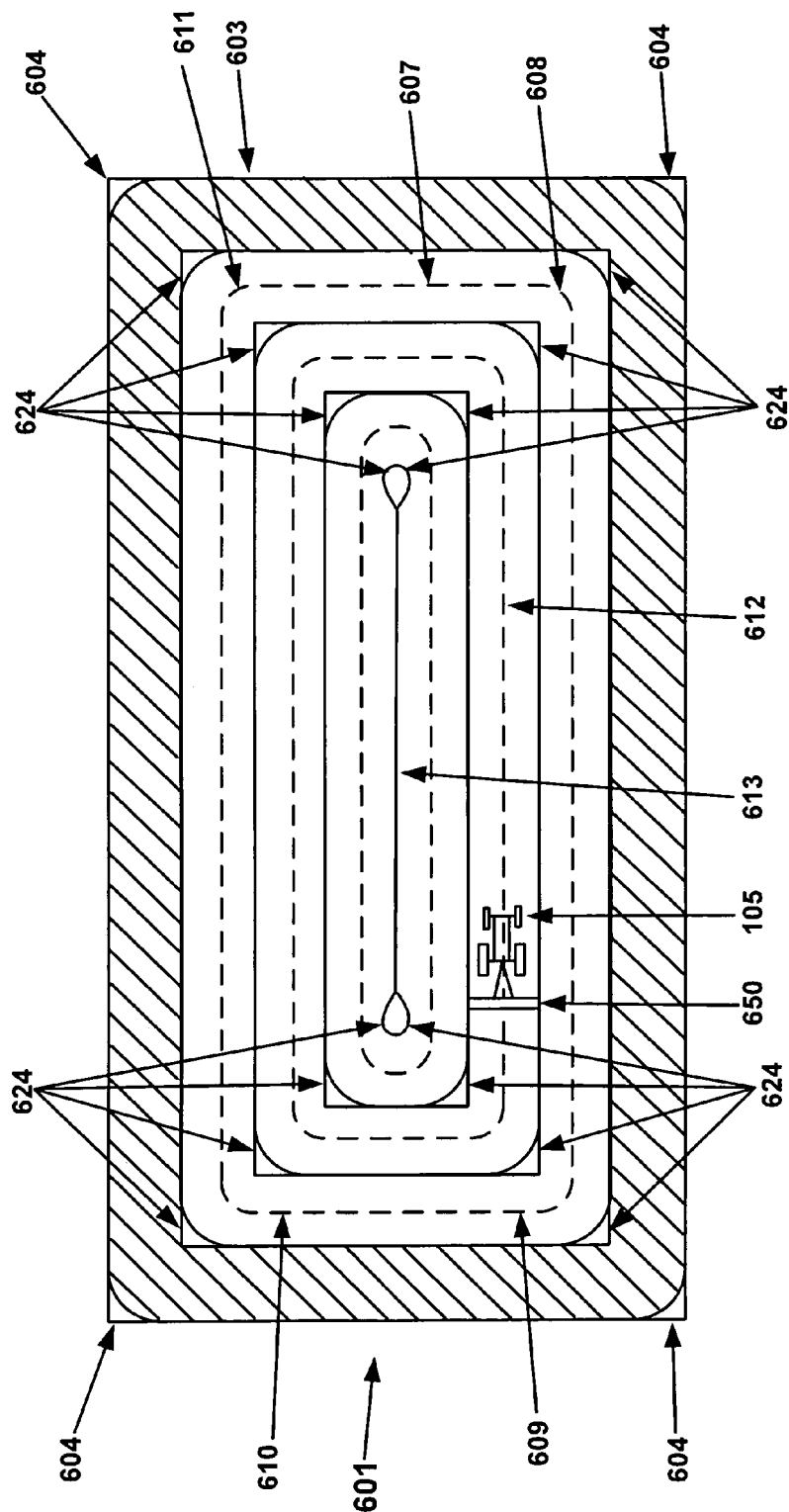
FIG. 6 shows another work area and a plurality of paths plotted in accordance with embodiments of the present invention.

FIG. 6 shows another work area 601 and a plurality of paths plotted in accordance with embodiments of the present invention. In the example of FIG. 6, work area 601 is rectangular. In FIG. 6, the swath boundaries are shown in solid lines, and the path plans for mobile machine are shown in broken lines.

Referring again to step 410 of FIG. 4, the driver accesses a first input path 603 around the circumference of work area 601, via stored geographic position data. The accessed path may leave un-worked areas 604 of work area 601. The driver then inputs the initial input path 603 into the system.

Referring again to step 420 of FIG. 4, the driver inputs the width of implement 650 into system 100. It is noted that the length of implement 650 may be input into system 100 if that has a greater impact on the minimum turning radius of mobile machine 105. In the embodiment of FIG. 6, system 100 sets the minimum turning radius ($r_{min}$) to eighty percent (80%) of the width of implement 650.

With reference again to step 430 of FIG. 4, system 100 determines a second path 607, which is substantially parallel to the first path 603.

Referring again to step 440 of FIG. 4, system 100 detects a first corner 608 in second path 607 and, upon determining that corner 608 has not yet been tested, proceeds to step 445. Since the radius of the circle fitted to first corner 608 is less than $r_{min}$, system 100 proceeds to step 450 and smoothes the first corner 608.

Repeating step 440, a second corner 609 of second path 607 is detected, and steps 445 and 450 are repeated, as for the first corner 608. The same occurs for third corner 610 and fourth corner 611. The smoothing process may result in additional un-worked areas 624.

Repeating step 440 reveals no further corners in second path 607, and system 100 proceeds to step 455 and outputs second path 607.

The second path 207 is driven, and the driver realigns mobile machine 105 to the approximate position of subsequent path 612. When the location of mobile machine 105 is approximately one implement width away from the second path 607, the system repeats steps 440-450, using second path 607 as the input path for a subsequent path 612.

It should be noted that the descriptions given above are illustrative only, and do not restrict the scope of this invention, which is intended to include such modifications and variations as may be apparent to one skilled in the art.

The preferred embodiment of the present invention, a method and system for determining the path of a mobile machine, is thus described. While the present invention has been described in particular embodiments, it should be appreciated that the present invention should not be construed as limited by such embodiments, but rather construed according to the following claims.

What is claimed is:

1. A system for controlling a mobile machine, said system comprising:
   a position determining component for determining the geographic position of said mobile machine; and
   a control component coupled with said position determining component, said control component for implementing a method for determining a path of said mobile machine comprising:
      accessing a first path which comprises at least one curved portion;
      determining a second path which is substantially parallel with said first path and which comprises a second curved portion that corresponds to said at least one curved portion;
      amending said second path wherein a radius of said second curved portion is at least equal to a minimum turning radius of said mobile machine.

2. The system of claim 1 wherein said method further comprises:
   accessing the minimum turning radius of said mobile machine when coupled with an implement.

3. The system of claim 1 wherein said position determining component comprises a ground based position determining system.

4. The system of claim 1 wherein said position determining system comprises a satellite based position determining system selected from the group consisting essentially of a global positioning system (GPS) system, a Global Navigation Satellite System (GNSS) system, a Radionavigation Satellite Service (RNSS) system, a differential GPS system, a real-time kinematics (RTK) system, a networked RTK system, a GLONASS system, and a Galileo system.

5. The system of claim 1 further comprising:
   a steering controller coupled with said control component, said steering controller for controlling a steering component of said mobile machine in response to a course correction generated by said control component.

6. The system of claim 5 further comprising a serial communication bus which communicatively couples said steering controller with said steering component of said mobile machine and wherein said serial communication bus is substantially compliant with the controller area network (CAN) protocol.

7. The system of claim 1 further comprising:
   a display device coupled with said control component for displaying a deviation of said mobile machine from said second path.

8. A control component for controlling a mobile machine, said control component comprising:
   an input for accessing a first path which comprises at least one curved portion;
   a determiner for determining a second path which is substantially parallel with said first path and which comprises a second curved portion that corresponds to said at least one curved portion;
   an amending component for amending said second path wherein a radius of said second curved portion is at least equal to a minimum turning radius of said mobile machine.

9. The control component of claim 8 wherein said input is further for accessing the minimum turning radius of said mobile machine when said mobile machine is coupled with an implement.

10. The control component of claim 8 wherein said input is further coupled with a position determining component comprising a ground based position determining system.

11. The control component of claim 8 wherein said input is further coupled with a position determining system comprising a satellite based position determining system selected from the group consisting essentially of a global positioning system (GPS) system, a Global Navigation Satellite System (GNSS) system, a Radionavigation Satellite Service (RNSS) system, a differential GPS system, a real-time kinematics (RTK) system, a networked RTK system, a GLONASS system, and a Galileo system.

12. The control component of claim 8 further comprising a course correction generator for generating a course correction to a steering controller of said mobile machine.

13. The control component of claim 12 further comprising an interface for conveying said course correction to said steering controller that is couple with a steering component of said mobile machine.

14. The control component of claim 8 further comprising:
  a display output for coupling said control component with a display device which displays said second path.

15. A computer-usable medium having computer-readable program code embodied therein for causing a computer system to perform a method for determining a path of a mobile machine comprising:
  accessing a first path of said mobile machine which comprises at least one curved portion;
  determining a second path for said mobile machine which is substantially parallel with said first path and which comprises a second curved portion that corresponds to said at least one curved portion;
  amending said second path wherein a radius of said second curved portion is at least equal to a minimum turning radius of said mobile machine.

16. The computer-usable medium of claim 15 wherein said method further comprises:
  accessing the minimum turning radius of said mobile machine when coupled with an implement.

17. The computer-usable medium of claim 15 wherein said method further comprises:
  utilizing a ground based position determining system to determine a geographic position of said mobile machine.

18. The computer-usable medium of claim 15 wherein said method further comprises:
  utilizing a satellite based position determining system to determine a geographic position of said mobile machine and wherein said satellite based position determining system is selected from the group consisting essentially of a global positioning system (GPS) system, a Global Navigation Satellite System (GNSS) system, a Radionavigation Satellite Service (RNSS) system, a differential GPS system, a real-time kinematics (RTK) system, a networked RTK system, a GLONASS system, and a Galileo system.

19. The computer-usable medium of claim 15 wherein said method further comprises:
  generating a message for automatically actuating the steering mechanism of said mobile machine in response to a course correction.

20. The computer-usable medium of claim 15 further comprising:
  generating a visual representation of a deviation from said second path.

* * * * *

UNITED STATES PATENT AND TRADEMARK OFFICE
CERTIFICATE OF CORRECTION

PATENT NO.       : 7,363,154 B2
APPLICATION NO.  : 11/248701
DATED            : April 22, 2008
INVENTOR(S)      : Robert James Lindores and Denis Allan Birnie Page 1 of 1

It is certified that error appears in the above-identified patent and that said Letters Patent is hereby corrected as shown below:

Title Page, Item (75) Inventor: Add --Denis Allan Birnie, Christchurch (NZ)-- as Second Named Inventor.

Signed and Sealed this

Eighth Day of July, 2008

JON W. DUDAS
*Director of the United States Patent and Trademark Office*